Patented Feb. 24, 1953

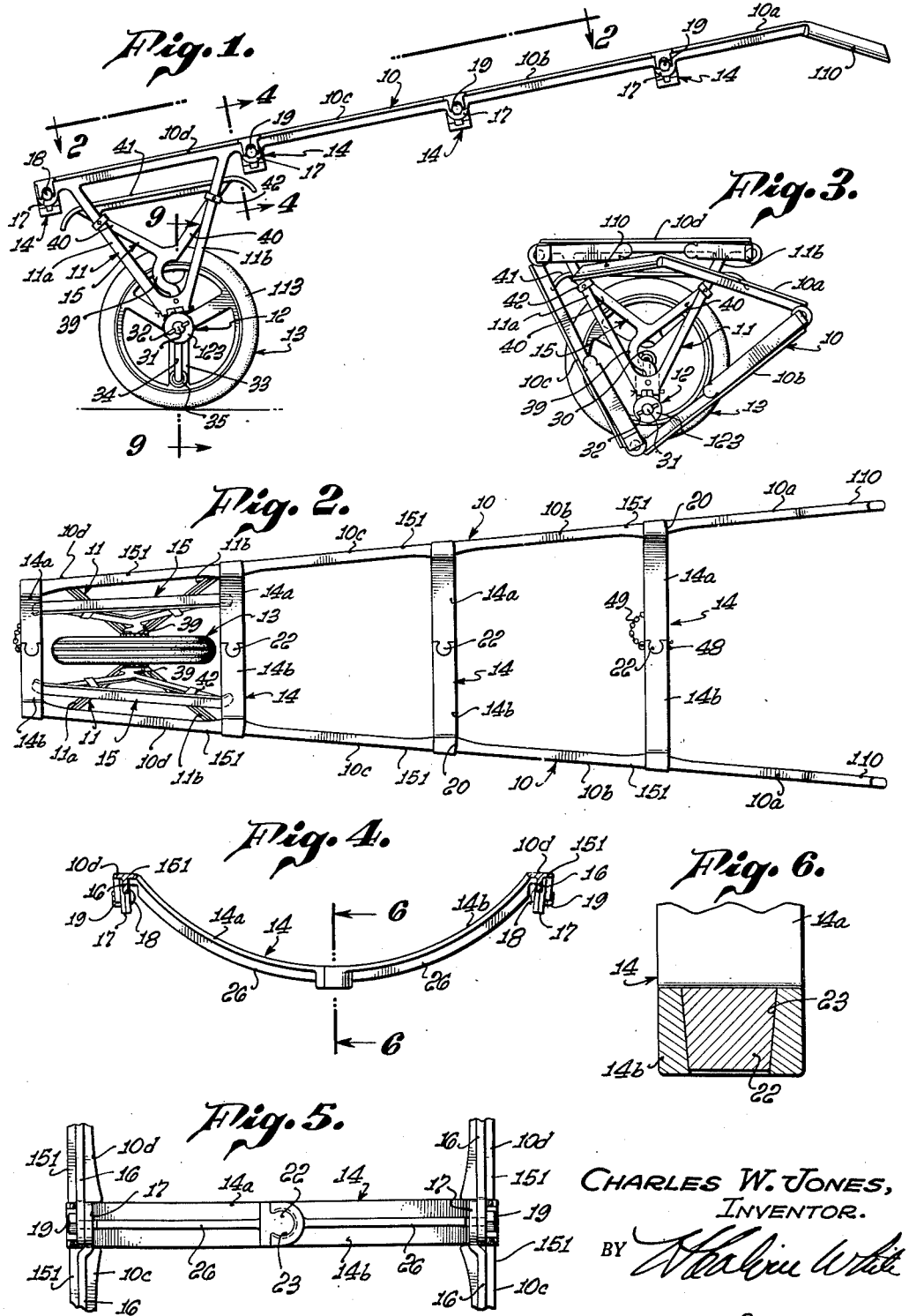

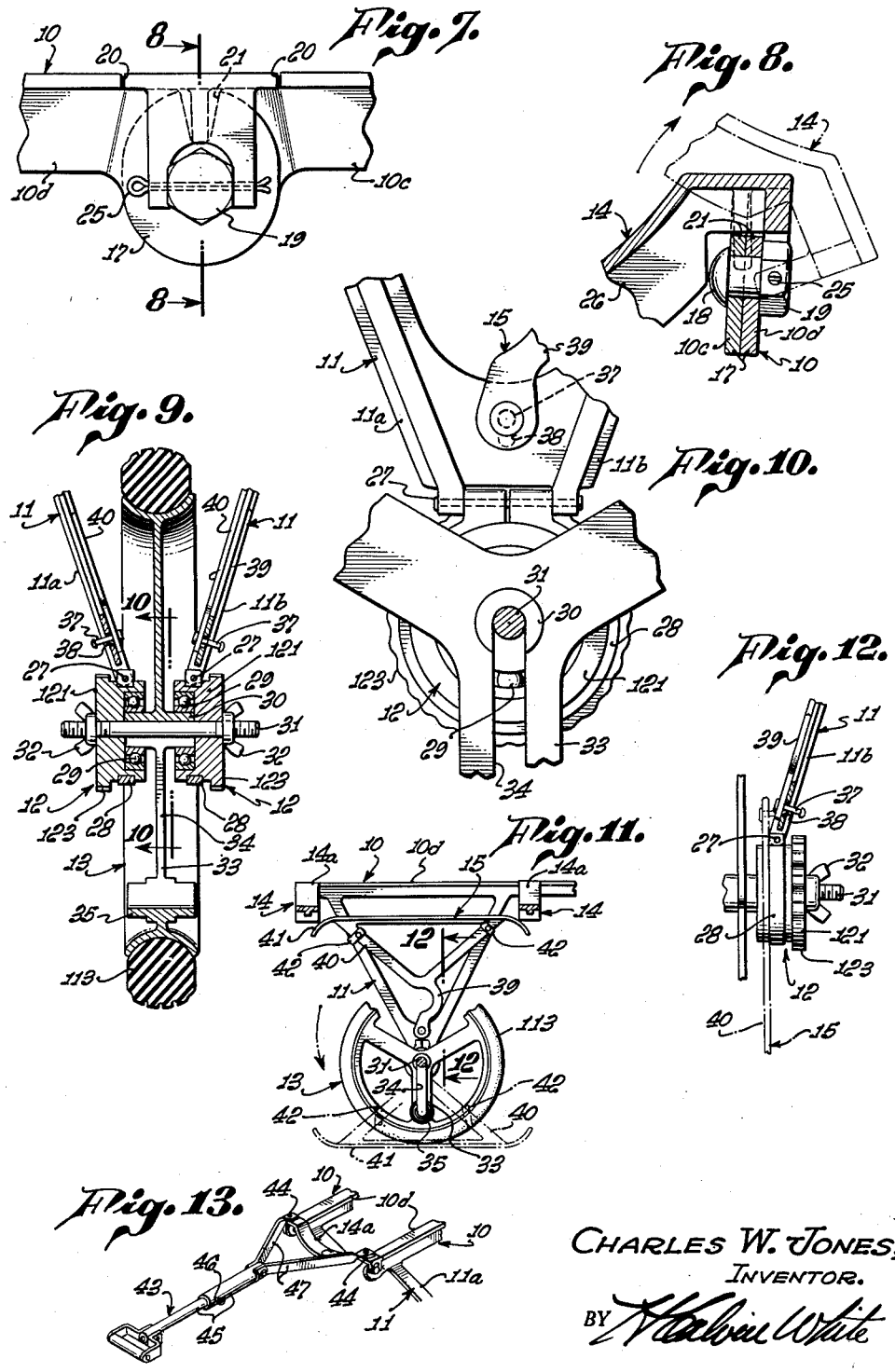

2,629,608

UNITED STATES PATENT OFFICE 2,629,608

ANIMAL CARRYING CART

Charles W. Jones, Ontario, Calif.

Application March 24, 1950, Serial No. 151,693

7 Claims. (Cl. 280—36)

This invention relates generally to improved collapsible carts particularly intended for use by hunters of wild game in transporting bagged animals from more or less remote areas to camps or nearby base locations. In certain respects, carts embodying the present invention are improvements on the form of cart shown in my copending application Ser. No. 72,491, filed January 24, 1949.

The general object of the invention is to provide a cart adapted to normally be carried in collapsed condition as a small, light weight unit while being easily erectable, when the occasion arises for its use, to form a rigid structure capable of transporting a relatively large and heavy animal. A particular feature of the cart involves its construction throughout in a manner such that little or no mechanical ability and no tools of any kind are required for its collapse or erection. Further, I facilitate erection and collapse of the cart, while at the same time insuring against the loss or separation of any of its parts, by a unique construction rendering the cart foldable to collapsed condition without the disconnection of any of the parts from the others. As will appear, even the fasteners employed for securing the various parts together are permanently attached to the foldable structure.

Structurally, the preferred form of cart includes a pair of elongated sectionally formed longitudinal frame members supported in laterally spaced relation by a suitable ground traveling unit, such as a wheel, and interconnected by a number of transverse load supporting members on which an animal may be placed. In collapsing the cart, the two longitudinal frame members are adapted to first be folded individually to reduced lengths and to then be swung laterally together in their folded conditions to form an extremely compact and easily handled unit. As will appear, the longitudinal members are preferably mounted for the above lateral movement by attachment to opposite sides of the ground travelling unit or wheel structure so that the individually folded members may be compactly received, in their collapsed condition, at opposite sides of the wheel. In this connection, a particular feature of the invention involves the mounting of the wheel in a manner to be positioned directly between the two folded frame members in the completely collapsed condition of the cart, this being achieved by mounting the wheel for limited movement transversely of its supporting bearing structure during the collapsing operation.

As previously brought out, the two longitudinal frame members are interconnected in their erected conditions by a number of transversely extending load supporting members. Certain rather important features of the invention involve the formation and mounting of these transverse members in a manner to retain the spaced frame members against both their individual longitudinal folding movement and their relative movement together.

As in the above Jones application, I employ a ground traveling unit useable on either dry ground or snow, the unit including a wheel for ordinary travel and a snow runner normally carried in an elevated position but adapted to be swung downwardly to an active position when needed. One purpose of the present invention is to provide a cart employing a movable runner of this type and yet in which the supports mounting the runner to the cart need not be strong enough to support the weight of the cart. To attain this result, I design the runner to directly engage the bottom of the wheel in its active position so that the weight of the cart is supported through the wheel rather than through the runner mounting. An additional and related feature of the invention involves the novel formation of the runner of a pair of sections mounted for individual retraction at opposite sides of the wheel.

The above and other features and objects of the present invention will be better understood from the following detailed description of the typical embodiment illustrated in the accompanying drawings, in which:

Fig. 1 is a side view of a preferred form of animal carrying cart embodying the invention and shown in its erected condition;

Fig. 2 is a plan view of the cart taken on line 2—2 of Fig. 1;

Fig. 3 is a view of the cart in an almost completely collapsed condition;

Fig. 4 is an enlarged transverse sectional view taken on line 4—4 of Fig. 1 and showing especially one of the transverse load supporting members;

Fig. 5 is a fragmentary view showing the underside of one of the transverse load supporting members;

Fig. 6 is an enlarged fragmentary sectional view through the interconnected portions of the two sections of a transverse load supporting member and taken on line 6—6 of Fig. 4;

Fig. 7 is an enlarged fragmentary side view of a joint interconnecting a pair of sections of one of the laterally spaced frame members;

Fig. 8 is a fragmentary transverse section taken on line 8—8 of Fig. 7;

Fig. 9 is an enlarged fragmentary vertical section through the wheel assembly or ground traveling unit taken on line 9—9 of Fig. 1;

Fig. 10 is an enlarged fragmentary transverse section through the wheel assembly taken on line 10—10 of Fig. 9;

Fig. 11 is a sectional view through the ground traveling unit with the wheel partially broken away to show one of the runners in its retracted position;

Fig. 12 is a fragmentary view of one of the wheel mounting bearings and showing especially the manner of mounting a runner to the cart; and Fig. 13 is a fragmentary perspective view of the forward end of the cart with an auxiliary tongue or pulling handle attached.

Referring first to Figs. 1 and 2, the illustrated preferred form of cart includes a pair of laterally spaced forwardly converging longitudinal frame members 10 each sectionally formed for individual longitudinal folding movement. These sectional frame members are mounted by wheel frames 11 to bearing assemblies 12 at the opposite sides of wheel 13 for relative movement together and apart between the erected condition of Fig. 2 and a collapsed condition in which the two frame members are positioned relatively close together. A number of sectionally formed transverse load supporting members 14 extend between the two spaced longitudinal members to carry an animal and to rigidly lock these longitudinal members against both longitudinal folding movement and movement laterally together. Snow traveling runner elements 15 are movably carried by wheel frames 11 for swinging movement between upper retracted positions and lowered active positions in which the runners proper are received beneath the wheel.

Each of the members 10 may include four sections 10a, 10b, 10c and 10d interconnected in a foldable end to end series, the upper one of these sections having a handle portion 110 by which the cart is normally controlled. As seen best in Fig. 4, these sections are of T-shaped transverse section, each having an upper horizontally extending portion 151 and a centrally depending rib 16. At the joints interconnecting adjacent sections of the longitudinal members, the depending ribs 16 are enlarged downwardly to form a pair of essentially circular ears 17 which are pivotally interconnected by transversely extending bolts 18 carrying nuts 19 at the outer side of the cart. These nuts are in each instance loose enough to permit relative pivotal movement between the connected frame member sections, and are themselves rotatable, with the screws, relative to the interconnected sections. At each of the joints of the longitudinal frame members 10, the upper horizontal portions 151 of the two interconnected sections terminate in a pair of spaced shoulders 20 (see Fig. 7), and between the shoulders the two connected sections contain a pair of upwardly facing recesses 21 adapted to exactly register in the extended Fig. 1 and Fig. 2 condition of the sections.

The transverse load supporting members 14 are each formed in two sections 14a and 14b carried by the longitudinal frame members respectively and rigidly interconnected at their inner ends in the erected condition of the cart. For this purpose, one of the sections 14a may have a tapered lug 22 of circular section receivable within a correspondingly tapered and circular recess 23 of the other section (see Fig. 6). Each of the sections 14a and 14b of the upper three transverse load supporting members is mounted to one of the nuts 19 at a joint connecting an associated pair of the sections of the corresponding member 10 and is movably carried by the nut for swinging movement between its erected inwardly projecting condition of Fig. 2 and an outer retracted condition extending alongside one of the sections of the frame member, as in Fig. 3. A fourth pair of transverse sections are carried by the lower most longitudinal sections 10d at their lower or forward ends. Each of the sections of the transverse load supporting members is pivotally mounted at its outer bifurcated end to one of the nuts 19 by a cotter key or suitable pin 25, this key also extending through the associated bolt to incidentally lock the nut and bolt against disconnection. From this point of pivotal connection to the nut and bolt, the transverse section extends upwardly at the outside of the corresponding ears 17, then extends inwardly across the top of the ears, and finally curves downwardly and inwardly to connect with a corresponding section from the other side of the cart. Each of the transverse sections has a depending central web portion 26 of a dimension corresponding substantially to the registering recesses 21 in the two associated longitudinal frame member sections, so that movement of the transverse section into its active inwardly projecting position rigidly interlocks the longitudinal sections against relative folding movement. Further, the sides of the transverse section are received between and in abutting engagement with shoulders 20 of the two interconnected longitudinal sections to assure the rigidity of the joint.

The two wheel frames 11 are formed integrally with the two lowermost longitudinal sections 10d and each comprise a pair of braces 11a and 11b converging downwardly and joined at their lower ends. As seen best in Figs. 9 and 10, each of these wheel frames is pivotally connected at its lower end to one of the bearing assemblies 12 for inward swinging movement with the associated longitudinal frame members 10 between the erected condition of Fig. 2 and a collapsed condition alongside the wheel. For this purpose, each of the bearing assemblies includes a circular body 121 having in its outer surface an annular recess within which a circular strap 28 is rotatably received and guided. This strap 28 is pivotally connected to the corresponding wheel frame 11 by a pin 27. At their inner sides, the bearing assemblies include a pair of ball bearings 29 receivable about the opposite ends of central hub 30 on the wheel to mount the wheel for rotation in the erected condition of the cart. The two bearing assemblies are interconnected by threaded attachment to the opposite ends of rod 31 extending through hub 30. The bearing bodies 121 may each have an enlarged irregularized outer flange 123 to facilitate manual rotation of the bearings relative to the connecting rod. Wing nuts 32 may be threaded onto the opposite ends of rod 31 at the outside of the bearings to act as lock nuts for retaining the bearings in their active positions of Fig. 9.

To permit movement of the wheel to a position directly between the two wheel frames 11 and their associated folded longitudinal frame members 10 in the collapsed condition of the cart, the wheel is specially formed for movement upwardly relative to the bearings from the active condition of Fig. 9. For this purpose, one of the radial spokes 33 of the wheel contains a slot 34 extending radially outwardly from the center of the wheel to an outer location at which a second hub-like portion 35 projects laterally from the opposite sides of the spoke. During collapse of the cart, wing nuts 32 and bearing assemblies 12 are threaded outwardly along rod 31 to positions at which hub 30 is released from ball bearings 29. The wheel may then be moved upwardly with rod 31 passing through slot 34 to a position within hub-like portion 35. The bearings may then be tightened together along rod 31 and about hub 35 to retain the wheel in an eccentric position relative to the bearings.

For use in snow, each of the wheel frames 11 carries a runner element 15 at its inner side for swinging movement between the upper retracted full line position of Fig. 11 and the active broken line position of that figure. Each of these runner elements is mounted to the cart by a headed pin 37 projecting laterally from the end of the runner element and extending through a slightly elongated slot 38 in the corresponding wheel frame so formed as to permit the runner element to extend angularly alongside the wheel frame in its retracted condition while being free for movement to a substantially vertically depending active condition (see Fig. 12). Each of the runner elements has a first curved portion 39 extending about the corresponding circular bearing with some clearance, and carries the runner proper 41 through a pair of angular braces 40. Straps 42 may be carried by braces 40 to extend about the wheel frame braces 11a and 11b for retaining the runner element in its retracted condition.

In order that the mounting portion of the two runner elements may be formed of relatively light construction, the runners are designed to directly engage the underside of the wheel tire 113 in their active conditions, to thus support the weight of the cart through the wheel and not through the supports 40. The two runners are retained in their active condition by passage of straps 42 about the wheel (see Fig. 11) and form together a double runner of considerable size. The curved portions 39 of the two runner elements extend about opposite sides of their corresponding bearings and are spaced from the two bearings predetermined relatively small distances (see Fig. 10) such that the runner elements and wheel may swing together through a predetermined arc relative to the cart frame structure as the cart moves up or down an incline or over an obstacle.

Fig. 13 shows an auxiliary tongue or handle assembly 43 which may be attached to the forward end of the cart by a pair of fasteners 44 when the load is such that two persons may be required to move it. This handle assembly includes a pair of telescopic members 45 relatively positioned by set screw 46 and connected to the forward end of the cart by a pair of angular members 47.

Normally the cart will be in a completely collapsed condition in which the two longitudinal frame members are individually folded at opposite sides of the wheel, the cart being shown approximately in this condition in Fig. 3. At this point it should be mentioned that the ears 17 forming the joint between the two lowermost sections 10c and 10d of each longitudinal frame member are bent slightly inwardly (see Figs. 4 and 8) so that the sections 10c, 10b and 10a will lie flatly against the side of the wheel and the wheel mounting frame in the collapsed condition of the cart. When the occasion arises for use of the cart, the various sections of the two longitudinal frame members 10 are opened to their extended or straight line condition of Fig. 1, and the associated sections 14a or 14b of the transverse load supporting members are swung outwardly from their retracted positions alongside the longitudinal members to their inwardly projecting active positions, as permitted by pivotal movement relative to nuts 19 and by bodily rotation with these nuts. Movement of each of the transverse sections to this inwardly projecting condition interlocks the corresponding longitudinal sections in their extended conditions by reception of web or rib 26 within recesses 21 and by engagement of the transverse section with shoulders 20 on the longitudinal sections. The extended longitudinal members 10 are then free to swing apart due to their pivotal connection to the two wheel mounting bearings by pins 27, and are retained in the spaced condition of Fig. 2 by interconnection of the sections 14a and 14b of the various transverse load supporting members. The upper and lower sets of these transverse sections may be positively retained in their erected relation by a pair of cotter keys 48 which are preferably permanently carried by the transverse member through chains 49.

The wheel is moved to its active position by first threading wing nuts 32 and bearings 12 outwardly along rod 31 to release eccentric hub portion 35 from ball bearings 29, and by then moving the wheel downwardly as seen in Fig. 9, to its active condition in which the bearings may be tightened about the central hub 30 to mount the wheel for rotation about its central axis. The animal to be carried is placed along the curved transverse members and may be easily transported over any type of terrain by virtue of the one wheel mounting of the cart. If snow is encountered, the two runner elements 36 are released from their upper positions to swing downwardly beneath and in engagement with the underside of the wheel. The runners are strapped in this condition and serve together to effectively support the weight of the cart through the wheel.

I claim:

1. A collapsible cart comprising a pair of laterally spaced elongated frame members, each of said frame members comprising a plurality of sections and means interconnecting said sections in an end to end series and for relative folding movement between an extended and a collapsed condition, means interconnecting said frame members for relative lateral movement between active positions in predetermined laterally spaced relation and collapsed inwardly displaced positions, a transverse load supporting member, means mounting said load supporting member to one of the frame members for swinging movement relative thereto between an active position projecting inwardly toward the other frame member and a collapsed outer position, means operable upon movement of the load supporting member to said inwardly projecting position to interlock a pair of sections of said one frame member against relative folding movement from extended condition, and a ground traveling unit for movably supporting the cart.

2. A collapsible cart comprising a pair of laterally spaced elongated frame members, each of said frame members comprising a plurality of sections and means interconnecting said sections in an end to end series and for relative folding movement between an extended and a collapsed condition, means interconnecting said frame members for relative lateral movement between active positions in predetermined laterally spaced relation and collapsed inwardly displaced positions, a transverse load supporting member including a pair of separable sections, means mounting said transverse member sections to the frame members respectively at joints connecting corresponding pairs of the frame member sections and each for swinging movement between an inwardly projecting active position and a collapsed outer position, means operable upon movement of each of said transverse member sections to its inwardly projecting position to interlock said pair of sections of the associated frame member against relative folding movement from extended condition, means for releasably interconnecting the transverse sections in said inwardly projecting positions, and a ground traveling unit for movably supporting the cart.

3. A collapsible cart comprising a pair of laterally spaced elongated frame members, each of said frame members comprising a plurality of sections and rotatable fasteners interconnecting said sections in an end to end series for relative folding movement between an extended condition and a collapsed condition, a transverse load supporting member, means mounting said loading supporting member to one of said rotatable fasteners and thereby to one of the frame members for pivotal movement relative to the fastener and for rotation therewith, whereby said load supporting member is swingable relative to said one frame member between an active position projecting laterally therefrom and toward the other frame member and a collapsed position alongside said one frame member, and a ground traveling unit for movably supporting the cart.

4. A collapsible cart comprising a pair of laterally spaced elongated frame members, each of said frame members comprising a plurality of sections and means interconnecting said sections in an end to end series for relative folding movement between an extended condition and a collapsed condition, a transverse load supporting member, means mounting said load supporting member to one of the frame members for swinging movement relative thereto between an active position projecting inwardly toward the other frame member and a collapsed outer position, means operable upon movement of the load supporting member to its inwardly projecting position to interlock an associated pair of sections of said one frame member against relative folding movement from extended condition, and a ground traveling unit for movably supporting the cart.

5. A collapsible cart comprising a pair of laterally spaced elongated frame members, each of said frame members comprising a plurality of sections and means interconnecting said sections in an end to end series for relative folding movement between an extended condition and a collapsed condition, a transverse load supporting member, means mounting said load supporting member to one of the frame members at a joint interconnecting a pair of its sections for swinging movement relative thereto between an active position projecting inwardly toward the other frame member and a collapsed outer position, said pair of sections having a pair of recesses registering in the extended position of the sections, means on the load supporting member movable into said recesses upon movement of the load supporting member to said inwardly projecting position to thereby interlock the pair of sections against relative folding movement from extended position, and a ground traveling unit for movably supporting the cart.

6. A collapsible cart comprising a pair of laterally spaced elongated frame members, each of said frame members comprising a plurality of sections and means interconnecting said sections in an end to end series for relative folding movement between an extended condition and a collapsed condition, a transverse load supporting member including a pair of separable sections, means mounting said transverse member sections to the frame members respectively at joints connecting corresponding pairs of the frame member sections and each for swinging movement between an inwardly projecting active position and a collapsed outer position, means operable to interlock each of said pairs of frame member sections against relative folding movement from said extended condition upon movement of the corresponding transverse member sections to its inwardly projecting position, means for releasably interconnecting said transverse member sections in their inwardly projecting positions, and a ground traveling unit for movably supporting the cart.

7. In a collapsible game carrying cart, a load supporting frame, a ground traveling wheel having a portion containing a slot extending outwardly from the center of the wheel, a rod extending through said slot in the wheel, a pair of bearings mounted to the frame, means attaching said bearings to opposite ends of said rod and for relative movement together and apart along said rod, and means on the wheel interengageable by said bearings in an inwardly displaced position thereof to mount the wheel for rotation relative to the bearings and disengageable in an outwardly displaced condition of the bearings to permit movement of the wheel transversely of the bearings.

CHARLES W. JONES.

REFERENCES CITED

The following references are of record in the file of this patent:

UNITED STATES PATENTS

| Number | Name | Date |
|---|---|---|
| 1,138,641 | Dolge | May 11, 1915 |
| 1,907,321 | Hilstrom | May 2, 1933 |
| 2,207,283 | Brown | July 9, 1940 |
| 2,422,331 | Bates | June 17, 1947 |
| 2,429,028 | Neeley | Oct. 14, 1947 |
| 2,450,051 | Manning | Sept. 28, 1948 |
| 2,464,525 | Nurney | Mar. 15, 1949 |
| 2,480,256 | Nurenberg et al. | Aug. 30, 1949 |
| 2,484,677 | Binz | Oct. 11, 1949 |
| 2,490,189 | Alexander | Dec. 6, 1949 |
| 2,490,988 | Wheeler | Dec. 13, 1949 |